United States Patent
Irie

(10) Patent No.: US 6,694,257 B1
(45) Date of Patent: Feb. 17, 2004

(54) METHOD FOR DISPLAYING GUIDE FOR VEHICLE-MOUNTED NAVIGATOR

(75) Inventor: Takashi Irie, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 15 days.

(21) Appl. No.: 10/070,133

(22) PCT Filed: Jul. 4, 2000

(86) PCT No.: PCT/JP00/04451
§ 371 (c)(1),
(2), (4) Date: Mar. 4, 2002

(87) PCT Pub. No.: WO02/03034
PCT Pub. Date: Jan. 10, 2002

(51) Int. Cl.$^7$ .................. G01C 21/34; G08G 1/0969
(52) U.S. Cl. .............. 701/211; 701/209; 340/995.2; 340/995.19
(58) Field of Search ................. 701/209, 211; 340/995.1–995.28

(56) References Cited

U.S. PATENT DOCUMENTS

| 5,608,635 | A | * | 3/1997 | Tamai .................. 701/209 |
| 5,832,406 | A | | 11/1998 | Iwami et al. |
| 6,333,702 | B1 | * | 12/2001 | Hiyokawa et al. ..... 340/995.21 |
| 6,574,551 | B1 | * | 6/2003 | Maxwell et al. ........... 701/209 |

FOREIGN PATENT DOCUMENTS

| EP | 0 837 434 A1 | 4/1998 |
| JP | 4-319986 A | 11/1992 |
| JP | 4-320292 A | 11/1992 |
| JP | 9-178502 A | 7/1997 |
| JP | 11-344355 | 12/1999 |

* cited by examiner

Primary Examiner—Michael J. Zanelli
(74) Attorney, Agent, or Firm—Birch, Stewart, Kolasch & Birch, LLP

(57) ABSTRACT

When one's vehicle goes into a road from outside the road, the direction of turning is indicated by guiding.

18 Claims, 5 Drawing Sheets

FIG.2
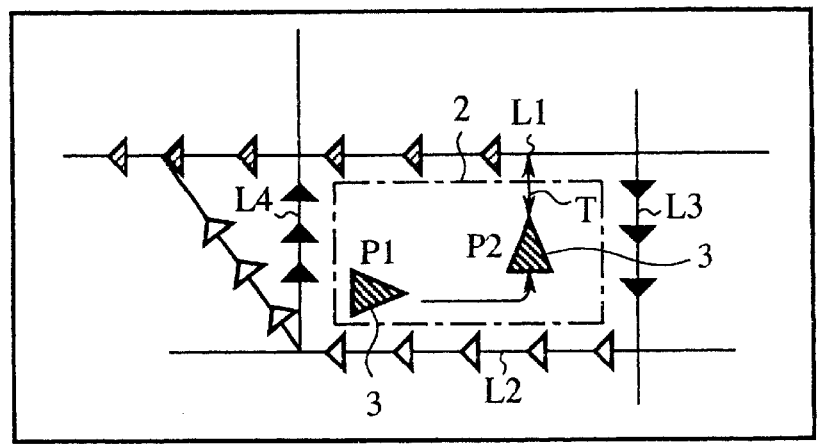
FIG.6
BACKGROUND ART
(a)
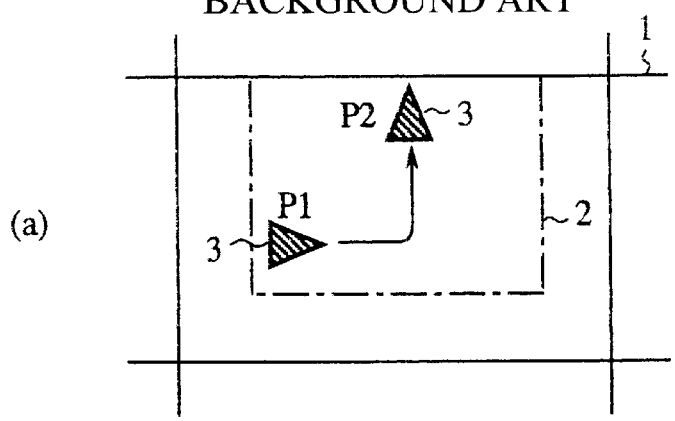
(b)
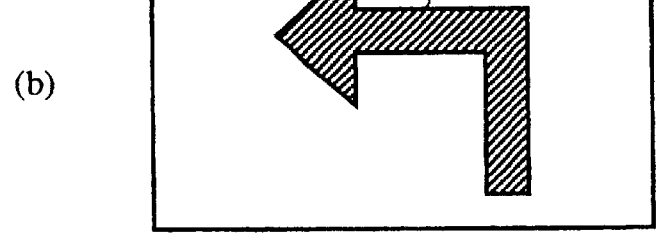

FIG.3
(a) 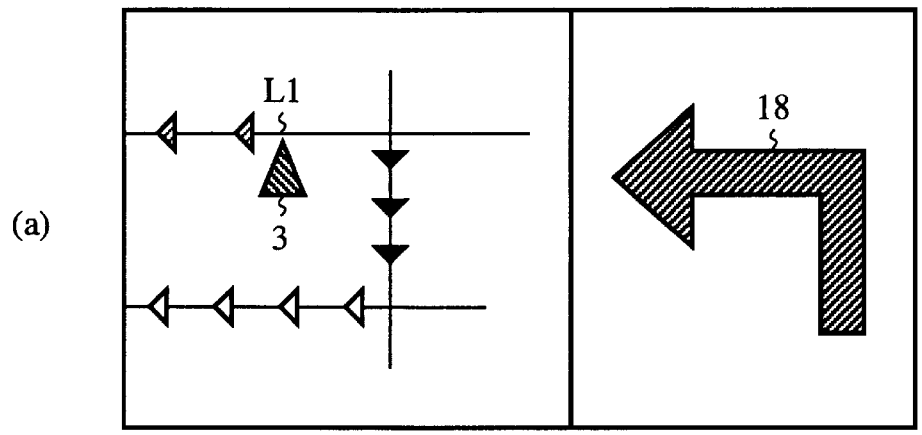
(b) 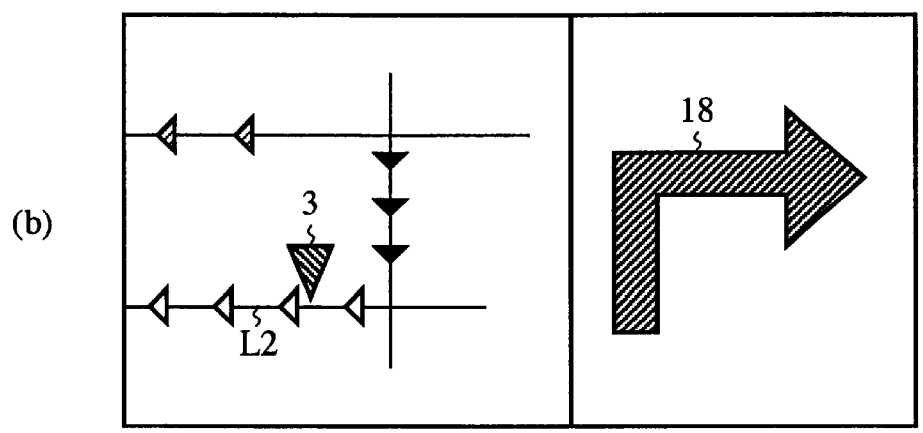
(c) 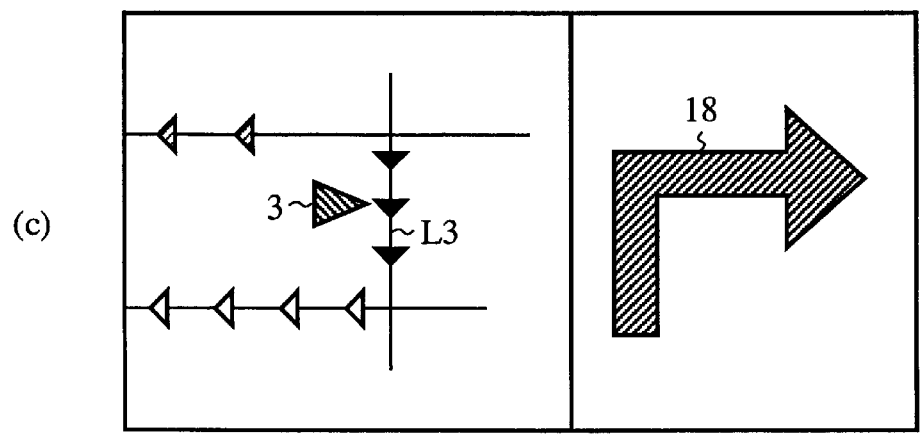

METHOD FOR DISPLAYING GUIDE FOR VEHICLE-MOUNTED NAVIGATOR

This application is the national phase under 35 U.S.C. §371 of PCT International Application No. PCT/JP00/04451 which has an International filing date of Jul. 4, 2000, which designated the United States of America.

Technical Field

This invention relates to a guide indication method in an onboard navigator which performs optimum route guiding or route instruction for a vehicle, and relates particularly to a guide indication method in an onboard navigator which reports by an arrow or by a voice which of the right and left directions to go when the vehicle enters into a road from outside the road, such as from a parking lot, or the like.

Background Art

Generally, the system of an onboard (in-vehicle) navigator is ordinarily arranged to provide guiding only when a vehicle is positioned on a road. Guiding is thus normally not even provided if the onboard navigator is operated outside the road such as in a parking lot, or the like to make a route searching to a destination. Therefore, as shown in FIG. 6, for example, when one's vehicle 3 parking at a position P1 of a parking lot 2 proceeds toward a road 1 to move to a position P2 near an exit of the parking lot 2 for further going into the road 1, the driver is not able to determine to which of the right and left he/she shall turn.

On the other hand, as an onboard navigator, there are known a so-called map navigator which indicates a map picture on a display to provide route guiding and instruction, and a so-called arrow navigator which indicates only by an arrow without indicating a map. In this kind of navigators, there is known a technique for indicating the direction from the position of one's vehicle to a destination by an icon of an arrow 4. This technique, however, performs only the route guiding regarding the roads stored in the map data for route searching purposes. It follows that, when one's vehicle goes into the road from a point outside the road (e.g., a parking lot, a park, or the like), it was not known which way to go first.

Therefore, conventionally, it was normal practice for the driver to go into the road, for the time being, by turning to the right or to the left at his/her discretion, an ordinary guide indication by the navigator being performed thereafter. It follows that the direction actually turned is sometimes opposite to the direction to the destination. In such a case, the driver had to go to the trouble of turning back the other way.

This invention has been made to solve the above-described drawback and has an object of providing a guide indication method in an onboard navigator which enables an indication of which of the right direction and the left direction to turn when one's vehicle goes into a road from outside the road, such as from a parking lot, or the like.

DISCLOSURE OF INVENTION

A guide indication method in an onboard navigator according to this invention in which a route guide to a destination is made by indicating an arrow on a display along a route set in advance comprises the step of guiding a turning direction of one's vehicle at a time of going into a road from outside the road.

Thus, when one's vehicle goes into the road from outside the road, the turning direction is known, so that one is able to smoothly travel on a searched route.

The guide indication method in an onboard navigator according to this invention further comprises the steps of: determining through a route searching outside the road as to whether one's vehicle is in matching with any one of links of departure place; if one's vehicle is not matching, performing a route searching for a link of departure place around one's vehicle; and when one's vehicle has proceeded into a position within a predetermined distance relative to an arbitrary link of departure place, guiding which of right and left directions to turn relative to a route of the arbitrary link of departure place.

Thus, when one's vehicle goes into the road from outside the road, the most optimum route from among a plurality of links of departure place around one's vehicle as well as the turning direction are known, so that one is able to smoothly travel on a searched route.

The guide indication method in an onboard navigator according to this invention further comprises the steps of: determining through a route searching outside the road as to whether one's vehicle is in matching with any one of links of departure place; if one's vehicle is out of matching, obtaining a route with a link nearest one's vehicle serving as a link of departure place; thereafter obtaining a relationship among a position of the link of departure place, a bearing of the route, and the position of one's vehicle; obtaining a name of the link of departure place from a data map file; and indicating a name of the road of the departure place, thereby guiding which of right and left directions to turn.

Thus, when one's vehicle goes into the road from outside the road, the most optimum route from the link nearest one's vehicle, the turning direction, and the name of the road of the departure place are known, so that one is able to smoothly travel on a searched route.

The guide indication method in an onboard navigator according to this invention is characterized in that the guide of the turning direction is made by an arrow or by a voice.

Thus, the turning direction is easily and accurately known.

BRIEF DESCRIPTION OF DRAWINGS

FIG. 2 is an explanation diagram showing the positional relationship among a parking lot, a link of departure place, and one's vehicle.

FIG. 3 includes explanatory diagrams showing the position of one's vehicle and the direction of arrow indication.

FIG. 6 includes an explanation diagram showing the relationship among a parking lot, a road, and one's vehicle and an explanation diagram showing an example of a conventional arrow indication.

BEST MODE FOR CARRYING OUT THE INVENTION

In order to describe this invention in more detail, a description will now be made about the best mode for carrying out the invention with reference to the accompanying drawings.

EMBODIMENT 1

Figure 1:
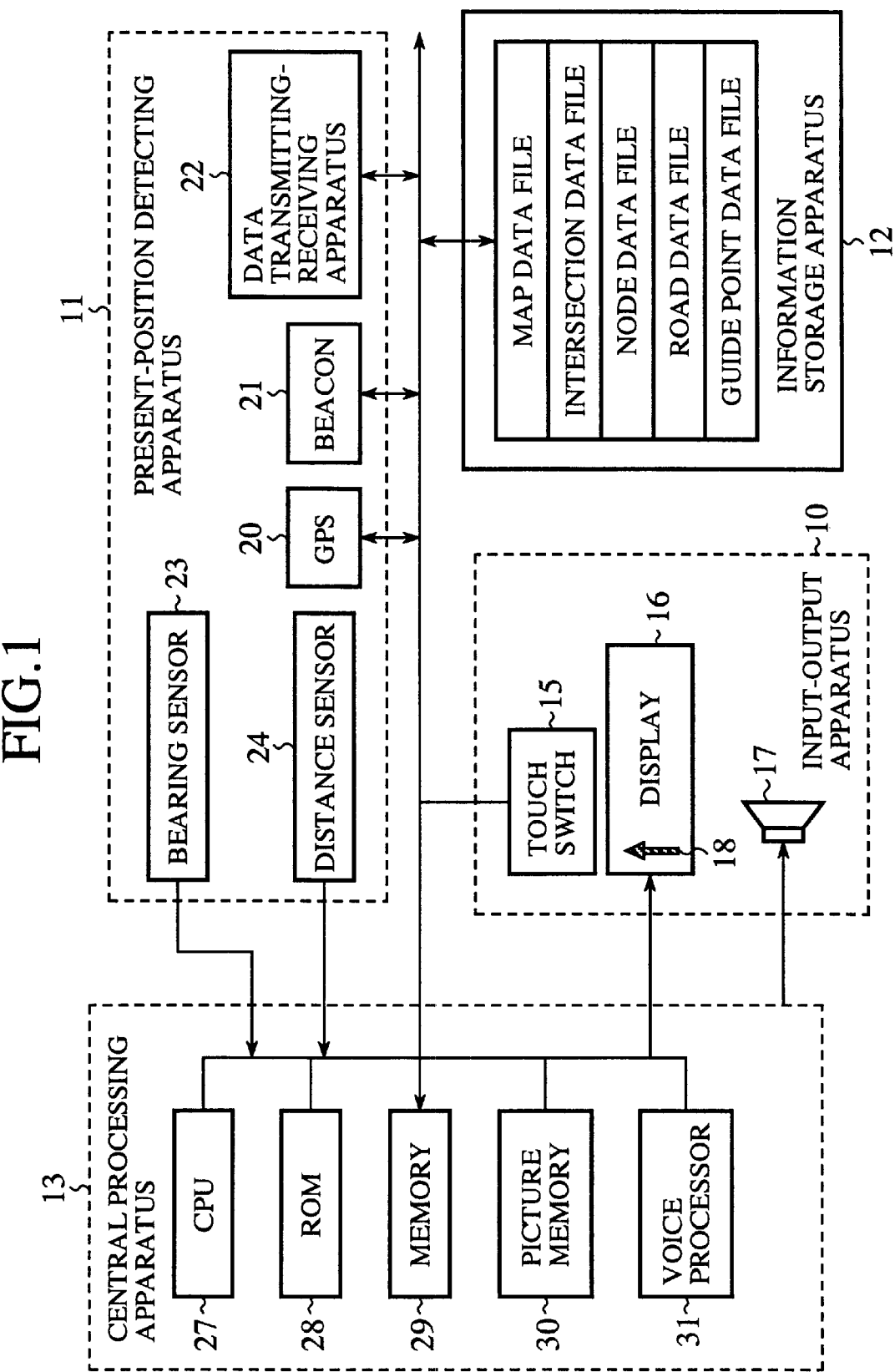
FIG. 1 is a block diagram of an onboard navigator for carrying out a guide indication method of this invention.

FIG. 1 is a block diagram showing one example of an onboard (in-vehicle) navigator for carrying out this invention. In the figure, reference numeral 10 denotes an input-output apparatus for inputting and outputting information relating to route guides, reference numeral 11 denotes a present-position detecting apparatus for inputting and outputting information relating to the present position of one's vehicle, reference numeral 12 denotes an information storage apparatus in which are recorded navigation data required for route computation as well as required guide data relating to the route guides, and reference numeral 13 denotes a central processing apparatus which performs route search processing, or guide processing required for route guiding by indication and by a voice, as well as a control of the entire system.

The input-output apparatus 10 is to input the information necessary for the settings of departure places, destinations, passing points, and the like, and to give a command to the central processing apparatus 13 to issue guide information as a voice output and as a picture screen indication when required by a driver, and is provided with a touch switch 15, a display 16, a speaker 17, and the like. In case of an arrow navigator, this display 16 indicates a road link and an arrow 18 showing the direction of the destination in the form of an icon, and the map guide is not indicated.

The present-position detecting apparatus 11 is composed of a GPS receiving apparatus 20 utilizing a global positioning system (GPS), a beacon receiving apparatus 21, a data transmitting-receiving apparatus 22, a bearing sensor 23, a distance sensor 24, and the like.

The information storage apparatus 12 is composed of: a map data file having stored therein map information required for the route guiding; an intersection data file having stored therein information relating to intersections; a road data file having stored therein information about the kind of the roads, a departure point and a terminal point of each road, or the like; a node data file having stored therein coordinates of latitudes and longitudes at certain points on the roads; and a guide point data file having stored therein positional coordinates of landmarks such as gas stations, convenience stores, or the like.

The central processing apparatus 13 is provided with: a central processing unit (CPU) 27 for computation processing by performing programs for the navigation system; a read-only memory (ROM) having stored therein a program for performing the processing such as route searching, or the like, a program for performing an indication control required for landmark indication at guided intersections, a program for performing a voice output control required for voice guide, and data required therefor, as well as indication data required for route guiding and map indication; a memory 29 for temporarily storing therein data of a route memory means which stores therein road information (road array data, guided intersection data) for route searching or after re-searching, as well as data on route guide information and data under computation processing; a picture memory 30 having stored therein picture data to be used in picture indication on the display; a voice processor 31 for synthesizing voice data read out from the information storage apparatus 12 based on a voice output control command from the CPU 27 and for converting them into analog signals to thereby output them to the speaker 17.

FIG. 2 is an explanation diagram showing the positional relationship among a parking lot, a link of departure place, and one's vehicle. Reference numeral 2 denotes a parking lot, reference characters L1, L2, L3, L4 denote links of departure place around the parking lot, and reference numeral 3 denotes one's vehicle. The figure shows a state in which one's vehicle is going into a road by moving from a state in which it parked in a position P1 to a position P2.

Figure 4:
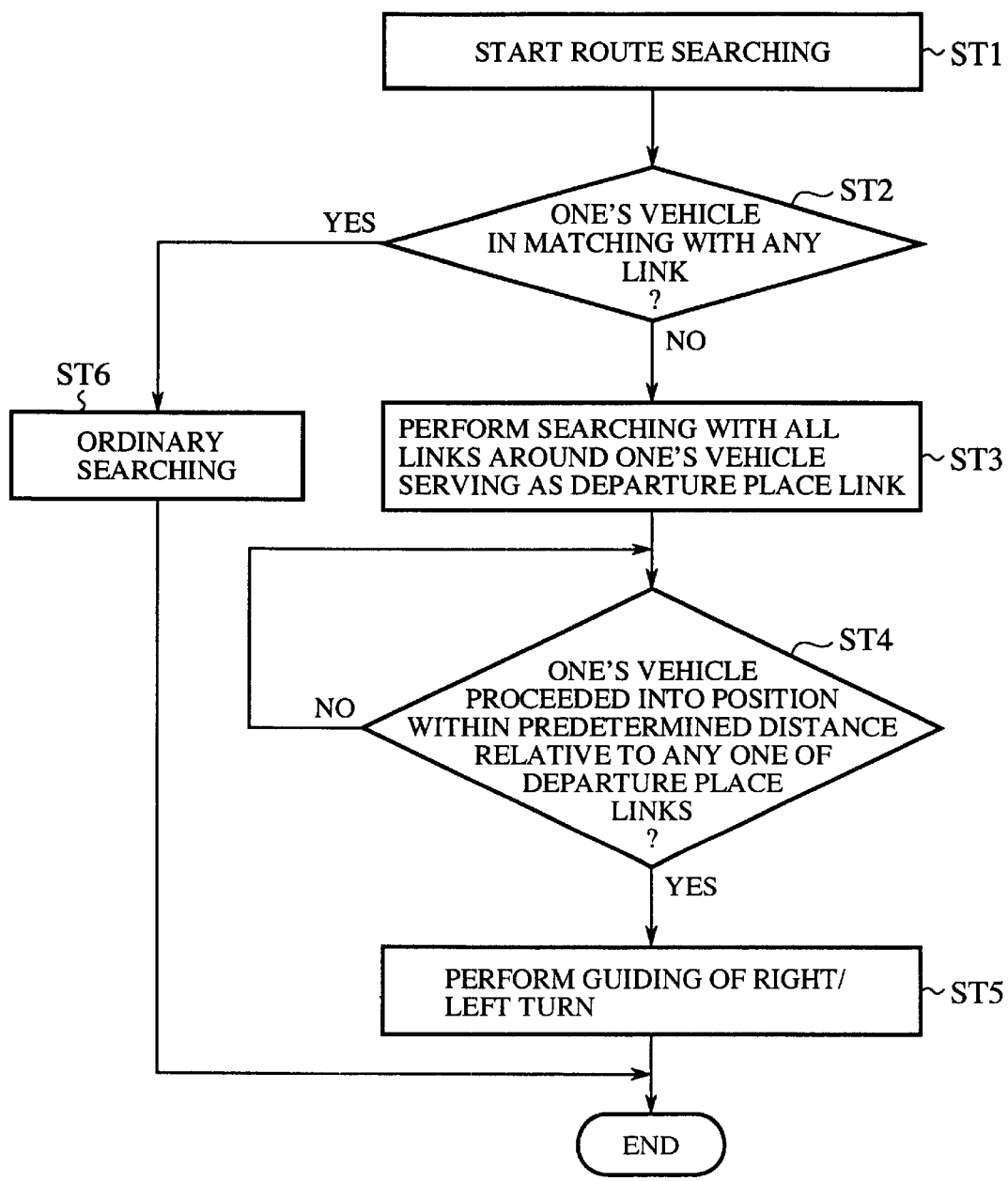
FIG. 4 is a flow chart showing the operation of embodiment 1 of this invention.

A description will now be given of the operation of embodiment 1 of this invention with reference to examples of picture screen indication in FIG. 3A through FIG. 3C and a flow chart in FIG. 4.

When one's vehicle 3 parked in the position P1 exits from the parking lot, a destination is inputted by the touch switch 15 into the onboard navigator. The onboard navigator then starts a route searching (FIG. 4, step ST1). The central processing apparatus 13 determines whether one's vehicle is in matching with any one of links (step ST2). If one's vehicle has been found to be in matching with any one of the links L1 through L4 of departure place, one's vehicle is in a state of being present on the road. Therefore, an ordinary route search processing as the onboard navigator is performed from the point in which the matching has been found to the destination (step ST6), thereby finishing the processing.

If one's vehicle has been found to be out of matching with any one of the links L1, L2, L3, L4 of departure place, one's vehicle is still in a state staying in the parking lot. Therefore, the central processing apparatus 13 performs a searching into a plurality of routes with all the links around one's vehicle serving as the link of departure place (step ST3).

As shown in FIG. 3(*a*), a determination is made as to whether one's vehicle moved, e.g., toward the link L1 of the departure place and as to whether one's vehicle has proceeded into a position within a predetermined distance T relative to the link L1 of the departure place (step ST4). If the result of determination is NO, the program waits as it is, and if it is YES, there is indicated on the display 16 an arrow (left-turn) 18 bent in the left direction which is the direction when one's vehicle enters the route of link L1 of the departure place. These determinations and indication control are all made in the central processing apparatus 13.

Similarly, as shown in FIG. 3(*b*), when one's vehicle moves toward the link L2 of the departure place, a determination is made as to whether one's vehicle has proceeded into a position within the predetermined distance T relative to the link L2 of the departure place (step ST4), and there is indicated on the display 16 an arrow (right-turn) 18 bent in the right direction which is the direction of the route of link L2 of the departure place. In addition, as shown in FIG. 3(*c*), when one's vehicle moves toward the link L3 of the departure place, a determination is made as to whether one's vehicle has proceeded into a position within the predetermined distance T relative to the link L3 of the departure place (step ST4), and there is indicated on the display 16 an arrow (right-turn) 18 bent in the right direction which is the direction of the route of link L3 of the departure place.

EMBODIMENT 2

Figure 5:
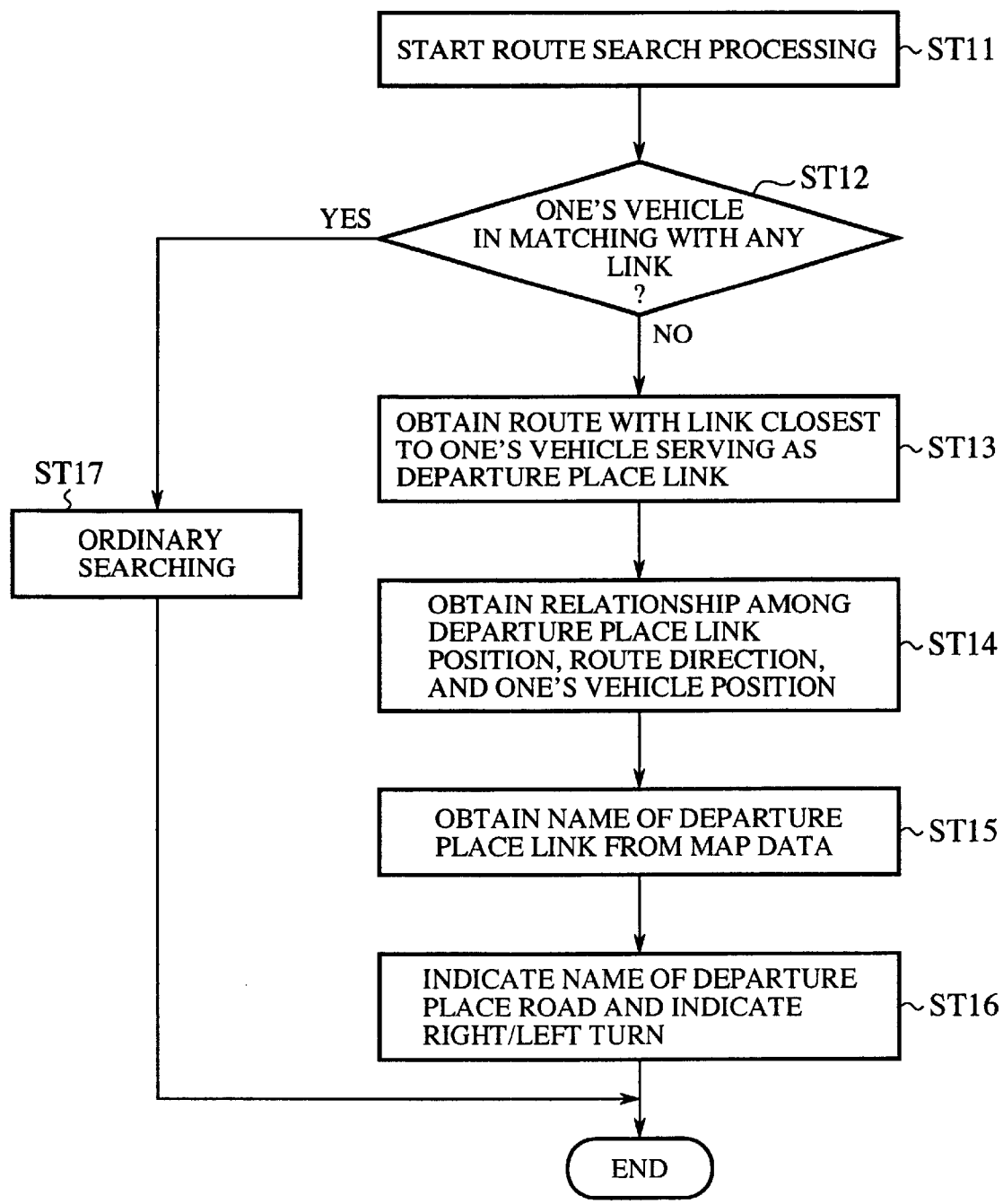
FIG. 5 is a flow chart showing the operation of embodiment 2 of this invention.

FIG. 5 shows a flow chart of an example in which the road name of the departure place is also indicated together with the arrow indication.

A destination is inputted into the onboard navigator by the touch switch 15. The onboard navigator then starts a route searching (FIG. 5, step ST11). The central processing apparatus 13 determines whether one's vehicle 3 is in matching with any one of links (step ST12). If one's vehicle has been found to be in matching with any one of the links L1 through L4 of the departure place, an ordinary route search processing is performed (step ST17).

If one's vehicle 3 has been found to be out of matching with any one of the links L1, L2, L3, L4 of the departure place, the central processing apparatus 13 obtains a route with the link nearest one's vehicle serving as the link of the departure place (step ST13). Then, the relationship among the position of the link of the departure place, the route direction, and the position of one's vehicle is obtained (step ST14). The name of the link of the departure place is obtained from the map data file of the information storage apparatus 12 (step ST15), and the indication of the road name of the departure place and the indication of the right or left turn are made (step ST16).

Here, in each of the above-described embodiments, in case the present place is away from the departure place of the route subject to the route searching (namely, in case one's vehicle is not present on the road within the map data for route searching), indication is conventionally made by an arrow only for the guiding from the departure place when one's vehicle goes from the present place into a certain road in the departure place. Therefore, in order for the driver not to get lost in determining which of the right turn and the left turn to make, the arrow of the direction in question is indicated after determining which of the right turn and the left turn is to be made. Alternatively, the speaker 17 may be operated by the central processing apparatus 13 to thereby issue a voice guide such as "turn to the left (right) after entering the departure road", or the like.

INDUSTRIAL APPLICABILITY

As described above, the onboard navigator according to this invention is capable of guiding when one's vehicle goes into a road from outside the road such as a parking lot, or the like. Therefore, when one's vehicle proceeds into the road from outside the road, it is capable of traveling in the direction of the destination without mistake.

What is claimed is:

1. A guide indication method in an onboard navigator that provides guiding information along a route to a destination, comprising:
    determining a position of a user's vehicle;
    deciding whether the user's vehicle position is on a road on a route to the destination or in a non-road area; and
    guiding, when said deciding step decides that the user's vehicle position is in a non-road area, a turning direction of the user's vehicle before the user's vehicle enters onto a road linked to the destination from the non-road area.
2. The guide indication method in an onboard navigator according to claim 1, wherein said guiding of the turning direction is made by displaying an arrow.
3. The guide indication method in an onboard navigator according to claim 1, wherein said guiding of the turning direction is made by a voice.
4. The guide indication method in an onboard navigator according to claim 1,
    wherein said deciding step determines through a route searching operation whether the user's vehicle position is in matching with any one of links of a departure place;
    wherein said guide indication method further comprises performing a route searching operation for a link of the departure place around the user's vehicle position when the user's vehicle position is out of matching; and
    wherein said guiding step guides which of right and left directions to turn relative to a route of an arbitrary link of the departure place, when the user's vehicle has proceeded into a position within a predetermined distance relative to said arbitrary link of the departure place.
5. The guide indication method in an onboard navigator according to claim 4, wherein the guiding as to which of right and left directions to turn is made by displaying an arrow.
6. The guide indication method in an onboard navigator according to claim 4, wherein the guiding as to which of right and left directions to turn is made by a voice.
7. The guide indication method in an onboard navigator according to claim 1,
    wherein said deciding step determines through a route searching operation whether the user's vehicle position is in matching with any one of links of a departure place;
    wherein said method further comprises:
        obtaining a route with a link nearest the user's vehicle position serving as a link of the departure place when the user's vehicle position is out of matching;
        obtaining a relationship among a position of said link of the departure place, a bearing of the route, and the position of the user's vehicle; and
        obtaining a name of said link of the departure place from a data map file;
    wherein said guiding step indicates a name of the road of the departure place and guides which of right and left directions to turn.
8. The guide indication method in an onboard navigator according to claim 7, wherein the guiding as to which of right and left directions to turn is made by displaying an arrow.
9. The guide indication method in an onboard navigator according to claim 7, wherein the guiding as to which of right and left directions to turn is made by a sound.
10. An onboard navigation apparatus that provides guiding information along a route to a destination, said apparatus comprising:
    a position detecting unit for determining a position of a user's vehicle;
    a processing unit for deciding whether the user's vehicle is on a road on a route to the destination or in a non-road area; and
    a guiding output unit outputting, when said processing unit decides that the user's vehicle position is in a non-road area, guiding information indicating a turning direction of the user's vehicle before the user's vehicle enters on a road on a route to the destination.
11. The onboard navigation apparatus according to claim 10, wherein said output unit includes a display that displays an arrow as the guiding information indicating a turning direction.
12. The onboard navigation apparatus according to claim 10, wherein said output unit includes a speaker that outputs the guiding information indicating a turning direction in the form of a voice signal.
13. The onboard navigation apparatus according to claim 10,
    wherein said processing unit determines through a route searching operation whether the user's vehicle position matches with any one of links of a departure place, performs a route searching operation for a link of the departure place around the user's vehicle position when the user's vehicle position is out of matching, and determines which of right and left directions to turn relative to a route of an arbitrary link of the departure place, when the user's vehicle has proceeded into a position within a predetermined distance relative to said arbitrary link of the departure place.

14. The onboard navigation apparatus according to claim 13, wherein said output unit includes a display that displays an arrow as the guiding information indicating a turning direction.

15. The onboard navigation apparatus according to claim 13, wherein said output unit includes a speaker that outputs the guiding information indicating a turning direction in the form of a voice signal.

16. The onboard navigation apparatus according to claim 10, wherein said processing unit determines through a route searching operation whether the user's vehicle position is in matching with any one of links of a departure place, obtains a route with a link nearest the user's vehicle position serving as a link of the departure place when the user's vehicle position is out of matching, obtains a relationship among a position of said link of the departure place, a bearing of the route, and the position of the user's vehicle, and obtains a name of said link of the departure place from a data map file, and wherein said guiding output unit indicates a name of the road of the departure place and guide information indicating which of right and left directions to turn.

17. The onboard navigation apparatus according to claim 16, wherein said output unit includes a display that displays an arrow as the guiding information indicating a turning direction.

18. The onboard navigation apparatus according to claim 16, wherein said output unit includes a speaker that outputs the guiding information indicating a turning direction in the form of a voice signal.

* * * * *